(12) United States Patent
Asakawa et al.

(10) Patent No.: US 9,720,252 B2
(45) Date of Patent: Aug. 1, 2017

(54) OPTICAL UNIT WITH SHAKE CORRECTION FUNCTION

(71) Applicant: NIDEC SANKYO CORPORATION, Suwa-gun, Nagano (JP)

(72) Inventors: Shinroku Asakawa, Nagano (JP); Mitsuo Yokozawa, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 9 days.

(21) Appl. No.: 15/000,484

(22) Filed: Jan. 19, 2016

(65) Prior Publication Data

US 2016/0216528 A1    Jul. 28, 2016

(30) Foreign Application Priority Data

Jan. 26, 2015    (JP) .................................. 2015-012384

(51) Int. Cl.
*G02B 27/64*    (2006.01)

(52) U.S. Cl.
CPC .................................. *G02B 27/646* (2013.01)

(58) Field of Classification Search
None
See application file for complete search history.

(56) References Cited

U.S. PATENT DOCUMENTS

| 3,372,890 A | * | 3/1968 | Bogard | ................. | F41G 7/2213 |
| | | | | | 244/3.17 |
| 2016/0216528 A1 | * | 7/2016 | Asakawa | ............. | G02B 27/646 |
| 2016/0334638 A1 | * | 11/2016 | Wagner | ................ | G02B 27/646 |

FOREIGN PATENT DOCUMENTS

| JP | 2010096805 A | 4/2010 |
| JP | 2010096863 A | 4/2010 |
| WO | 2011155178 A1 | 12/2011 |

* cited by examiner

*Primary Examiner* — W B Perkey
(74) *Attorney, Agent, or Firm* — Cantor Colburn LLP

(57) ABSTRACT

An optical unit with a shake correction function may include an optical module having a movable body holding an optical element, a support body swingably supporting the movable body around two axial lines perpendicular to an optical axis of the optical element, and a swing drive mechanism structured to be capable of reciprocatedly swinging the movable body with respect to the support body around the two axial lines, and a rolling correction drive mechanism structured to be capable of reciprocatedly turning the optical module around the optical axis. The rolling correction drive mechanism includes a single phase motor in which the number of salient poles of a stator core around which a stator coil is wound is two times of the number of magnetic poles of a rotor magnet.

21 Claims, 13 Drawing Sheets

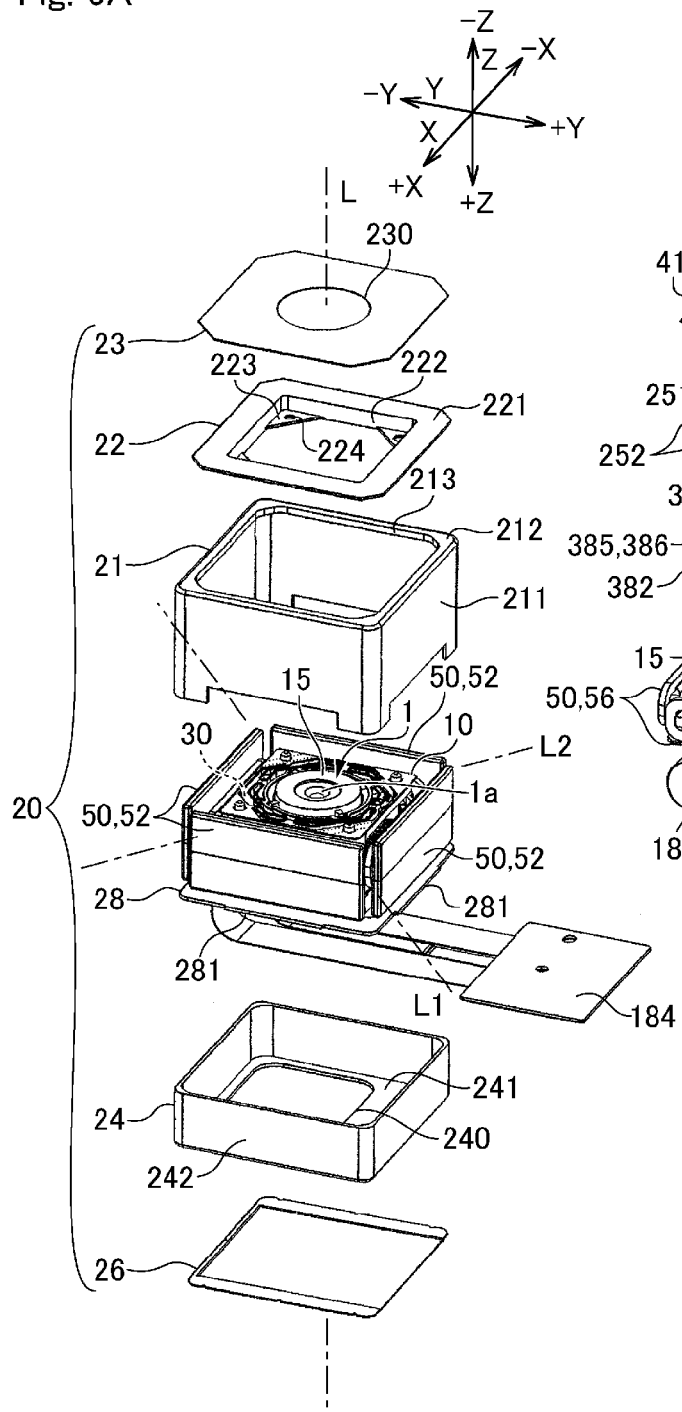
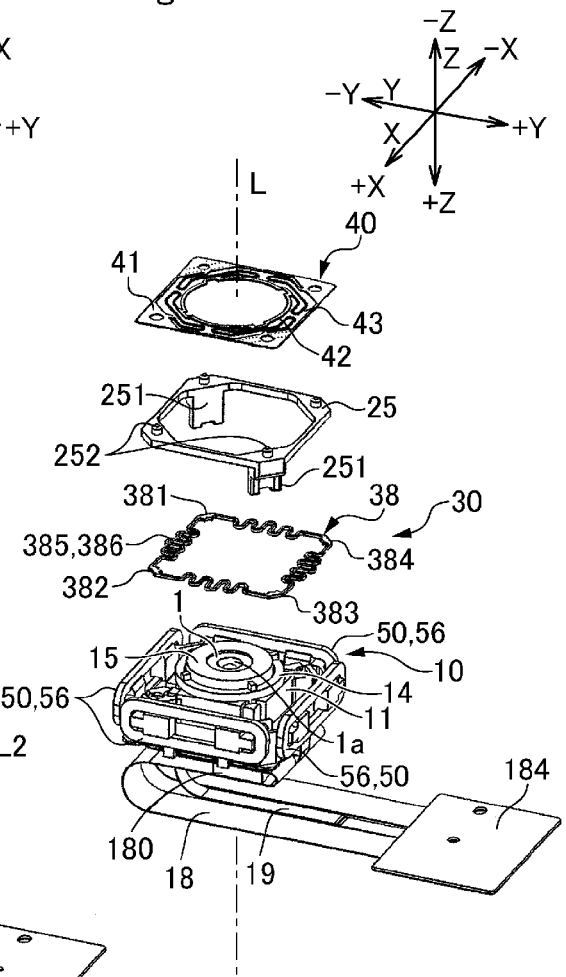
Fig. 5A
Fig. 5B

OPTICAL UNIT WITH SHAKE CORRECTION FUNCTION

CROSS REFERENCE TO RELATED APPLICATION

The present invention claims priority under 35 U.S.C. §119 to Japanese Application No. 2015-012384 filed Jan. 26, 2015, the entire content of which is incorporated herein by reference.

FIELD OF THE INVENTION

At least an embodiment of the present invention may relate to an optical unit with a shake correction function which is mounted on a cell phone with a camera or the like.

BACKGROUND

In an optical unit used in an imaging device which is mounted on a portable terminal, a drive recorder, an unmanned helicopter and the like, shake correction is required for suppressing disturbance of a photographed image due to a shake. In order to perform the shake correction, a technique has been proposed in which a photographing unit is swingably supported by a support body and a shake is corrected by swinging the photographing unit in a pitching direction corresponding to pitching (vertical swing, i.e., tilting) and by swinging a yawing direction corresponding to yawing (lateral swing, i.e., panning) (see Japanese Patent Laid-Open No. 2010-96805 and Japanese Patent Laid-Open No. 2010-96863).

A technique has been also proposed in which a shake (rolling) around an optical axis of a photographing unit is corrected (see, for example, International Publication WO 2011/155178). In an optical unit described in International Publication WO 2011/155178, a panning drive coil and a rolling drive coil are integrally or adjacently provided on a common yoke and a tilting drive coil and a rolling drive coil are integrally or adjacently provided on a common yoke.

However, in a case that a panning drive coil and a rolling drive coil are integrally or adjacently provided on a common yoke and a tilting drive coil and a rolling drive coil are integrally or adjacently provided on a common yoke like a structure described in International Publication WO 2011/155178, magnetic interferences are generated when corrections in respective directions are performed and thus its control is extremely complicated. Further, in the structure described in International Publication WO 2011/155178, a Lorentz force is utilized and thus a sufficient torque cannot be obtained.

SUMMARY

In view of the problem described above, at least an embodiment of the present invention may advantageously provide an optical unit with a shake correction function which is capable of performing a rolling correction independently from a pitching correction and a yawing correction with a sufficient torque.

According to at least an embodiment of the present invention, there may be provided an optical unit with a shake correction function including an optical module having a movable body which holds an optical element, a support body which swingably supports the movable body around two axial lines perpendicular to an optical axis of the optical element, and a swing drive mechanism structured to be capable of reciprocatedly swinging the movable body with respect to the support body around the two axial lines, and a rolling correction drive mechanism structured to be capable of reciprocatedly turning the optical module around the optical axis. The rolling correction drive mechanism includes a single phase motor in which a number of salient poles of a stator core around each of which a stator coil is wound is two times of a number of magnetic poles of a rotor magnet.

In at least an embodiment of the present invention, an optical module includes a movable body holding an optical element and a swing drive mechanism, and a pitching correction and a yawing correction are performed in the optical module and a rolling correction is performed by turning the optical module around the optical axis by a rolling correction drive mechanism. Therefore, the rolling correction is independently performed from the pitching correction and the yawing correction and thus control of the swing correction is easily performed. Further, in a case that the rolling correction is not required, the optical module can be used independently. Further, a single phase motor is used in the rolling correction drive mechanism and the single phase motor utilizes an attraction force and a repulsive force by a rotor magnet and thus a large torque can be obtained in comparison with a case that a Lorentz force is utilized. Even in this case, the number of the salient poles of the stator core is two times of the number of magnetic poles of the rotor magnet and thus the winding number of the stator coil around the salient pole can be reduced. Therefore, the volume occupied by the stator coil is reduced and thus the size of the single phase motor can be reduced.

In at least an embodiment of the present invention, the single phase motor reciprocatedly turns the optical module within an angular range interposed by two adjacent peak points of a cogging torque with a stable point as a center. According to this structure, the single phase motor is not required to apply a torque exceeding a ripple of the cogging torque to the optical module and thus power saving of the single phase motor can be attained. Further, the cogging torque applied to the optical module can be utilized as a magnetic spring for returning the optical module to a reference position around the optical axis and thus a mechanical spring is not required to provide separately.

In at least an embodiment of the present invention, the number of the magnetic poles is four (4) and the number of the salient poles is eight (8) in the single phase motor. According to this structure, a cogging torque cycle of the single phase motor is 45°. Therefore, an angular distance between peak points of the cogging torque is 22.5° (±11.25° and thus a rolling correction angular range of 12° (±6° which is practically required for a rolling correction can be obtained sufficiently.

In at least an embodiment of the present invention, the optical unit includes a stopper mechanism structured to restrict a movable range of the optical module around the optical axis. According to this structure, the optical module can be prevented from turning excessively by a torque applied from the outside.

In at least an embodiment of the present invention, a rotor of the single phase motor and the optical module are connected with each other through a connection member, the stopper mechanism includes a stopper protruded part which is formed in the connection member, and the movable range of the optical module is restricted by abutting the stopper protruded part with a unit case surrounding the optical module and the single phase motor. According to this structure, the stopper mechanism is structured without using another member. For example, it may be structured that the connection member is provided with a rectangular plate part which supports the optical module and a positioning protruded part provided in the plate part, the optical module is fixed to the plate part in a state that the optical module is positioned by the positioning protruded part, and a stopper mechanism for restricting a movable range of the optical module around the optical axis is provided between the connection member and the unit case.

In at least an embodiment of the present invention, the movable range which is restricted by the stopper mechanism is set to be narrower than the angular range interposed by the two peak points of the cogging torque.

In at least an embodiment of the present invention, the single phase motor includes a bearing which turnably supports the rotor magnet, a bearing holder which holds the bearing, and a support member which holds the bearing holder. The support member is provided with a bottom plate part which holds the bearing holder on an opposite-to-output side of the single phase motor, and a side plate part which is bent from the bottom plate part to an output side for protecting the single phase motor on an outer side in a radial direction. According to this structure, the single phase motor can be protected by the support member.

In at least an embodiment of the present invention, the single phase motor includes a stator having the stator core and the stator coil, and a rotor having a rotation shaft which is capable of turning together with the rotor magnet, the stator core is provided with a circular ring-shaped part and a plurality of the salient poles which are protruded in a radial direction from the circular ring-shaped part and around each of which the stator coil is wound, the rotation shaft of the rotor is connected with the optical module through a connection member, and an axial center of the rotation shaft is coincided with the optical axis. According to this structure, since the optical module and the single phase motor are coaxially disposed with each other and thus the size in a radial direction of the optical unit is restricted from being increased.

In at least an embodiment of the present invention, the single phase motor includes a bearing which turnably supports the rotor magnet, a bearing holder which holds the bearing, and a support member which holds the bearing holder. The support member is fixed to a unit case surrounding the optical module and the single phase motor, the stator is held by the support member through the bearing holder, and the optical module is supported by the support member so as to be capable of reciprocatedly turning around the optical axis through a rotation shaft of the single phase motor. According to this structure, the optical module and the single phase motor are held by the support member for the single phase motor and thus the structure can be simplified.

In at least an embodiment of the present invention, the rotor is an outer rotor having the rotor magnet which is held on an inner face of a cylindrical shaped body part of a rotor case, the rotor magnet faces the salient poles on an outer side in the radial direction, an inner peripheral face of the rotor magnet which faces the salient poles is a magnetized face which is alternately magnetized with an "S"-pole and an "N"-pole in a circumferential direction with equal angular intervals, an angular position detection sensor for detecting an angular position of the rotor faces the rotor magnet on an opposite side to the salient poles and, when the rolling correction drive mechanism is not driven, the angular position detection sensor faces a magnetic pole boundary line between the "N"-pole and the "S"-pole of the rotor magnet. According to this structure, the angular position detection sensor detects an angular position of the rotor magnet where distribution of the magnetic flux density of the rotor magnet in a circumferential direction is varied continuously and gradually on an opposite side to the magnetized face of the rotor magnet. Therefore, a high degree of linearity of an output from the angular position detection sensor can be attained.

In at least an embodiment of the present invention, a coil wire which structures the stator coil is wound around a pair of two adjacent salient poles in the same direction, the coil wire is wound around another pair of two adjacent salient poles in the opposite direction, and winding directions of the coil wire around two salient poles facing one pole of the rotor magnet are opposite to each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are exploded perspective views showing an optical module of an optical unit in accordance with an embodiment of the present invention which is viewed from an object side.

DETAILED DESCRIPTION OF THE PREFERRED EMBODIMENTS

Embodiments for attaining the present invention will be described below with reference to the accompanying drawings. In the following description, a structure for preventing a shake of an optical unit for photographing will be described as an example. Further, in the following description, an optical unit with a shake correction function is simply referred to as an "optical unit". Further, in the following description, three directions perpendicular to each other are referred to as an "X"-axis direction, a "Y"-axis direction and a "Z"-axis direction, and a direction along an optical axis "L" (optical axis of a lens, optical axis of an optical element) is set to be the "Z"-axis direction, a direction perpendicular to the "Z"-axis direction is set to be the "Y"-axis direction, a direction intersecting the "Z"-axis direction and the "Y"-axis direction is set to be the "X"-axis direction. Further, in the following description, regarding shakes of respective directions, turning around the "X"-axis corresponds to pitching (vertical swing), turning around the "Y"-axis corresponds to yawing (lateral swing), and turning around the "Z"-axis corresponds to rolling. Further, "+X" is indicated on one side of the "X"-axis direction, "−X" is indicated on the other side, "+Y" is indicated on one side of the "Y"-axis direction, "−Y" is indicated on the other side, "+Z" is indicated on one side (opposite side to an object side, rear side in an optical axis direction) of the "Z"-axis direction, and "−Z" is indicated on the other side (object side, front side in the optical axis direction).

(Entire Structure of Optical Unit for Photographing)

Figure 1:
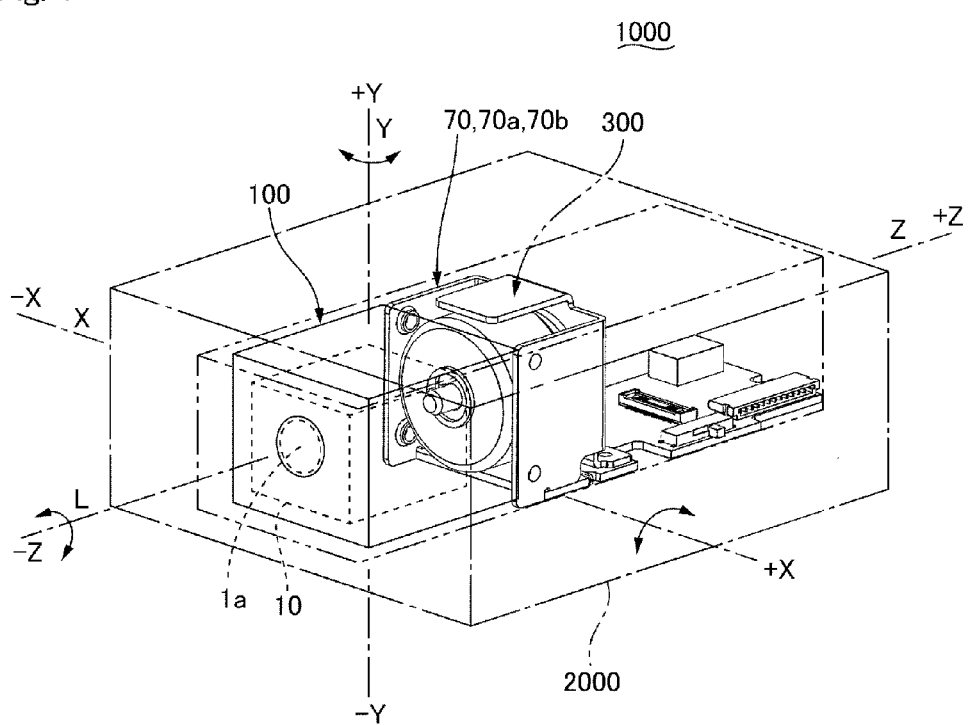
FIG. 1 is a schematic explanatory view showing a state that an optical unit in accordance with an embodiment of the present invention is mounted on an optical device.

FIG. 1 is a schematic explanatory view showing a state that an optical unit 300 in accordance with an embodiment of the present invention is mounted on an optical device 1000.

An optical unit 300 (optical unit with a shake correction function) shown in FIG. 1 includes an optical module 100 having an optical element such as a lens 1a whose optical axis "L" is extended along the "Z"-axis direction and is used in an optical device 1000 such as an imaging device which is mounted on a portable terminal, a drive recorder and an unmanned helicopter. The optical unit 300 is mounted on the optical device 1000 in a supported state by a chassis 2000 (device main body). In the optical unit 300, when a shake or the like is occurred in the optical device 1000 at the time of photographing, disturbance occurs in a photographed image. In order to prevent the problem, in the optical unit 300, a shake is detected by a shake detection sensor such as a gyroscope. In the optical module 100, based on a detected result of the shake detection sensor, a movable body 10 (photographing unit) holding the lens 1a is swung around two axes ("X"-axis and "Y"-axis) perpendicular to an optical axis "L" by a swing drive mechanism described below (not shown in FIG. 1) and thereby pitching and yawing are corrected. In this embodiment, the optical unit 300 further includes a rolling correction drive mechanism 70 and, based on a detected result of a shake detection sensor such as a gyroscope, the optical module 100 is turned around the "Z"-axis (around the optical axis "L") and thereby rolling is corrected.

(Entire Structure of Optical Unit 300)

Figure 2A:
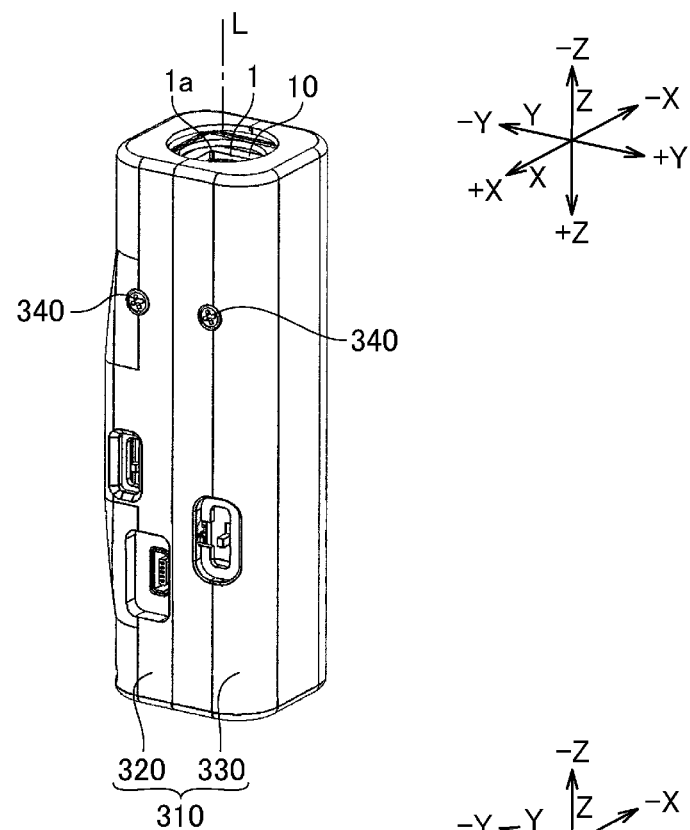
FIGS. 2A and 2B are explanatory views showing an optical unit in accordance with an embodiment of the present invention.
Figure 2B:
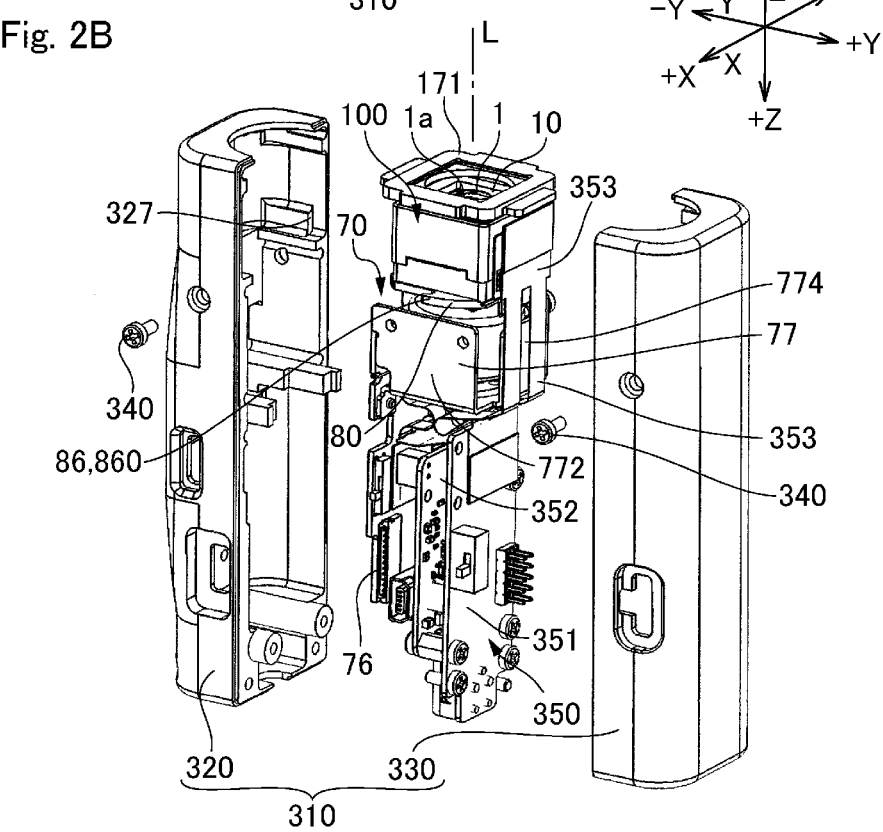
Figure 3:
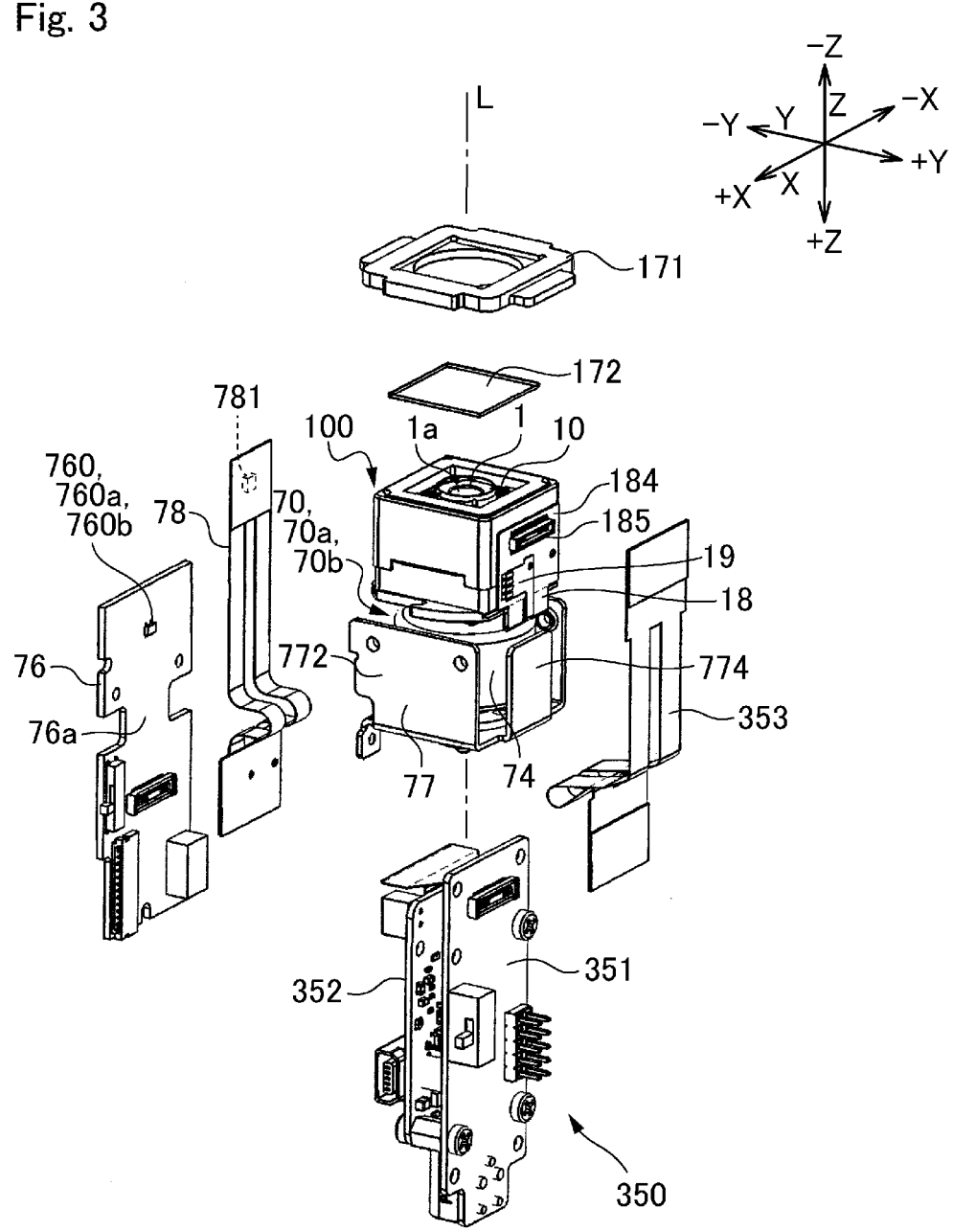
FIG. 3 is an exploded perspective view showing an internal structure of an optical unit in accordance with an embodiment of the present invention.
Figure 4:
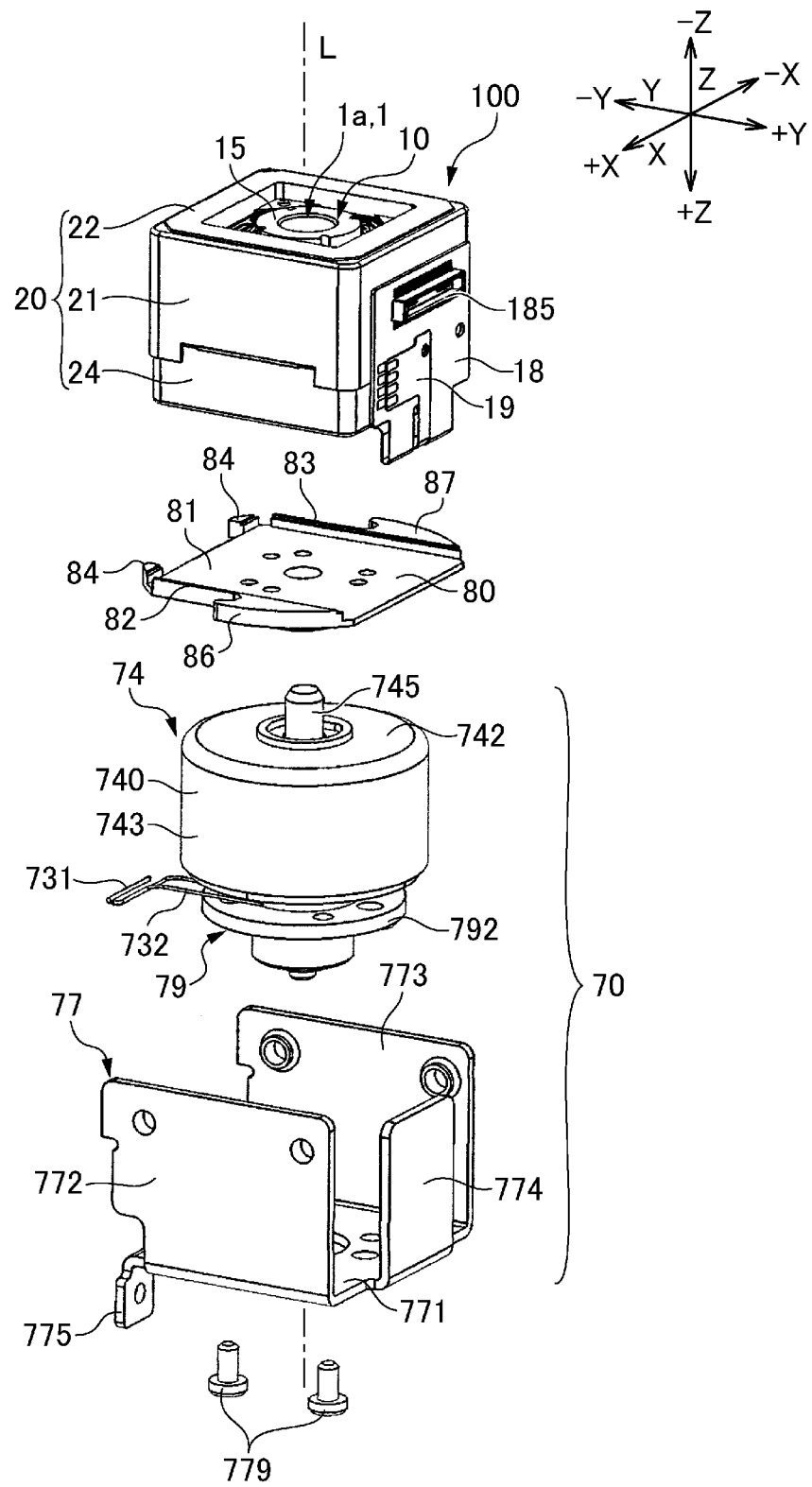
FIG. 4 is an exploded perspective view showing a positional relationship between an optical module and a rolling correction drive mechanism in an optical unit in accordance with an embodiment of the present invention.

FIGS. 2A and 2B are explanatory views showing the optical unit 300 in accordance with an embodiment of the present invention. FIG. 2A is a perspective view showing the optical unit 300 and FIG. 2B is an exploded perspective view showing the optical unit 300 from which a unit case 310 is detached. FIG. 3 is an exploded perspective view showing an internal structure of the optical unit 300 in accordance with an embodiment of the present invention. FIG. 4 is an exploded perspective view showing a positional relationship between the optical module 100 and a rolling correction drive mechanism 70 in the optical unit 300 in accordance with an embodiment of the present invention.

As shown in FIGS. 2A and 2B, FIG. 3 and FIG. 4, the optical unit 300 in this embodiment includes a unit case 310 which is extended in the "Z" direction, and a control part 350, a rolling correction drive mechanism 70 and the optical module 100 are disposed in an inside of the unit case 310 from one side "+Z" of the "Z" direction to the other side "−Z" in this order. The unit case 310 is structured of a first case member 320 and a second case member 330 which cover the control part 350, the rolling correction drive mechanism 70 and the optical module 100 from both sides in the "Y"-axis direction. The first case member 320 and the second case member 330 are fixed to a support member 77 of the rolling correction drive mechanism 70 by screws 340. In other words, the support member 77 of the rolling correction drive mechanism 70 is fixed to the first case member 320 and the second case member 330 by using the screws 340 and is utilized as a fixed part for the rolling correction drive mechanism 70 and the optical module 100 with respect to the unit case 310 of the optical unit 300.

A spacer 171 is held by an end part on the other side "−Z" of the "Z"-axis direction of the unit case 310 so as to cover the optical module 100. A cover glass 172 is disposed between the spacer 171 and the optical module 100.

The control part 350 includes a first circuit board 351 on which a connector, an IC and the like are mounted and a second circuit board 352 for inputting and outputting a signal from and to the outside. The optical unit 300 includes a flexible circuit board 353 which connects the optical module 100 with the first circuit board 351.

The optical unit 300 includes a circuit board 76 in which a control circuit and the like of the rolling correction drive mechanism 70 are structured and a flexible circuit board 78 which is connected with a side face on the other side "−Y" of the "Y"-axis direction of the optical module 100. One side end part of the flexible circuit board 78 which is connected with the optical module 100 is mounted with a gyroscope 781 for detecting a shake of the optical module 100 around the optical axis "L" (rolling). The other side end part of the flexible circuit board 78 is connected with the circuit board 76.

(Entire Structure of Optical Module 100)

Figure 6A:
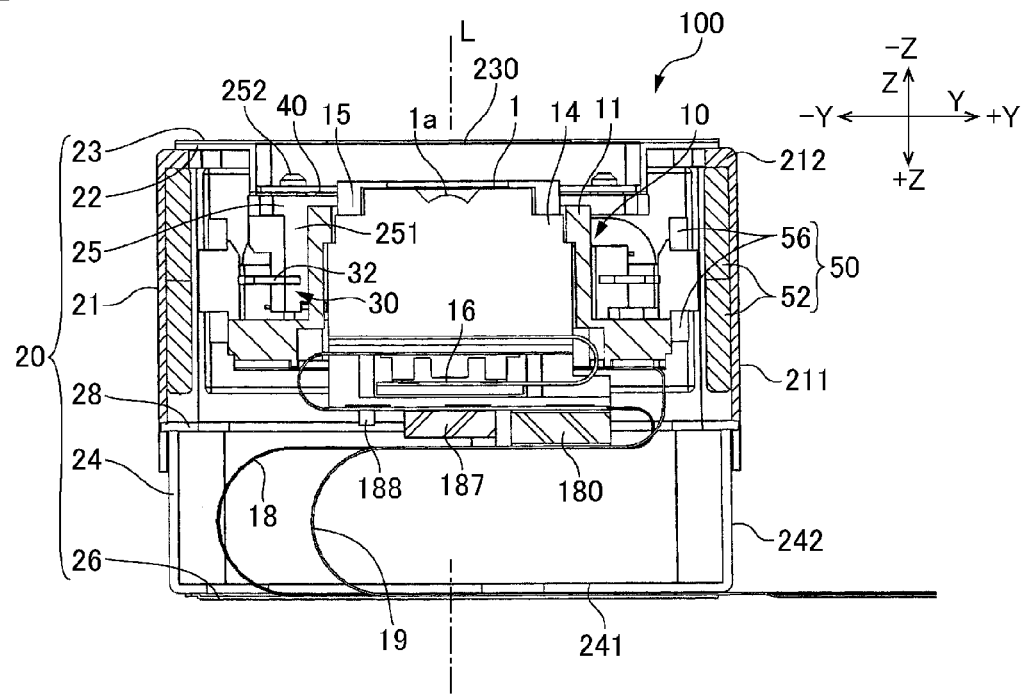
FIGS. 6A and 6B are explanatory cross sectional views showing a structure of an optical module of an optical unit in accordance with an embodiment of the present invention.
Figure 6B:
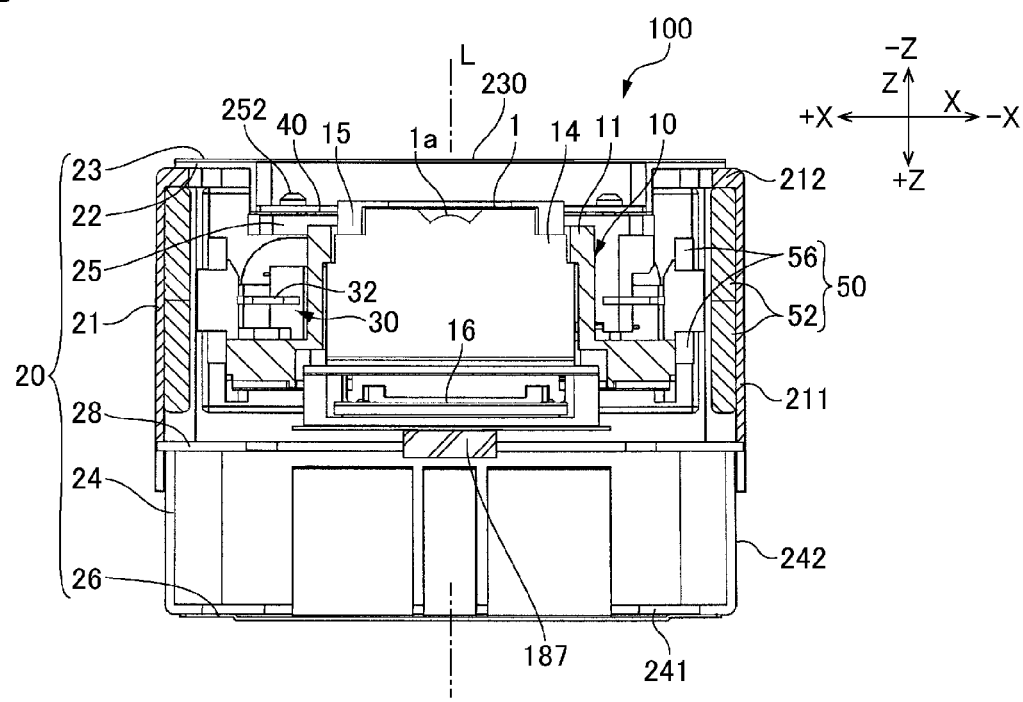

FIGS. 5A and 5B are exploded perspective views showing the optical module 100 of the optical unit 300 in accordance with an embodiment of the present invention which is viewed from an object side. FIG. 5A is an exploded perspective view showing the entire optical module 100 and FIG. 5B is an exploded perspective view showing a movable body 10 and the like. FIGS. 6A and 6B are explanatory cross sectional views showing a structure of the optical module 100 in accordance with an embodiment of the present invention. FIG. 6A is a "YZ" cross-sectional view showing the optical module 100 and FIG. 6B is a "ZX" cross-sectional view showing the optical module 100.

In FIGS. 5A and 5B and FIGS. 6A and 6B, the optical module 100 in this embodiment includes a support body 20, a movable body 10 having a photographing module 1, a gimbal mechanism 30 as a support mechanism which swingably supports the movable body 10 with respect to the support body 20, and a swing drive mechanism 50 structured between the movable body 10 and the support body 20. The swing drive mechanism 50 swings the movable body 10 around two axial lines (first axial line "L1" and second axial line "L2") which are perpendicular to the optical axis "L".

The support body 20 includes a module case 21. The module case 21 is provided with a body part 211 in a rectangular tube shape which surrounds the movable body 10 and an end plate part 212 in a rectangular frame shape which is projected to an inner side in a radial direction from an end part on the other side "−Z" of the "Z"-axis direction of the body part 211. A rectangular opening part 213 is formed in the end plate part 212. Further, the support body 20 includes a cover 22 fixed to the other side "−Z" of the "Z"-axis direction of the module case 21 and a cover sheet 23 (not shown in FIGS. 2A and 2B, FIG. 3 and FIG. 4) fixed to the other side "−Z" of the "Z"-axis direction of the cover 22. The cover 22 is provided with a plate-shaped frame part 221 which is superposed on the end plate part 212 of the module case 21 and a side plate part 222 in a rectangular tube shape which is bent to one side "+Z" of the "Z"-axis direction from an inner circumferential edge of the frame part 221. The side plate part 222 is inserted to an inner side of the module case 21 through an opening part 213 of the module case 21. A connecting part 223 in a triangular plate shape is formed at four corner portions at an end part on one side "+Z" of the "Z"-axis direction of the side plate part 222. The connecting part 223 is formed with a hole 224 for fixing a fixed frame 25 described below. In this embodiment, the cover sheet 23 is formed with a window 230 through which light from an object to be photographed is incident on the lens 1a.

The support body 20 includes a first bottom plate 24 in a rectangular shape which covers one side "+Z" of the "Z"-axis direction of the module case 21. The first bottom plate 24 is provided with a rectangular bottom plate part 241 and a side plate part 242 which is protruded to the other side "−Z" of the "Z"-axis direction from an outer side edge of the bottom plate part 241. The first bottom plate 24 is formed with an opening part 240 for extending flexible circuit boards 18 and 19 connected with the optical module 100 to the outside. The opening part 240 is covered by a second bottom plate 26 which is superposed on the first bottom plate 24 from one side "+Z" of the "Z"-axis direction. Further, the support body 20 includes a plate-shaped stopper 28 in a rectangular frame shape which is disposed so as to surround the movable body 10. The plate-shaped stopper 28 restricts a movable range of the movable body 10 toward one side "+Z" of the "Z"-axis direction. An outer circumferential edge of each of respective sides of the plate-shaped stopper 28 is formed with a protruded part 281 which is protruded to an outer side. Therefore, when the first bottom plate 24 and the module case 21 are superposed on each other in the "Z" direction, the protruded parts 281 of the plate-shaped stopper 28 are sandwiched between the side plate part 242 of the first bottom plate 24 and the body part 211 of the module case 21. Accordingly, when the side plate part 242 of the first bottom plate 24, the body part 211 of the module case 21, and the protruded parts 281 of the plate-shaped stopper 28 are joined to each other by welding or the like, the first bottom plate 24, the plate-shaped stopper 28 and the module case 21 are integrated with each other.

The movable body 10 includes a photographing module 1 having an optical element such as the lens 1a and the like, and a weight 15. The photographing module 1 includes a holder 14 which holds the lens 1a and a frame 11 which holds the holder 14. A coil 56 is held on both side end parts in the "X"-axis direction and on both side end parts in the "Y"-axis direction of the frame 11. The holder 14 holds the lens 1a, a focusing drive actuator (not shown), a photographing circuit module 16 having an imaging element and the like. The weight 15 is a nonmagnetic metal component which is fixed to the holder 14 and is used to adjust a gravity center position in the optical axis "L" direction of the movable body 10.

The movable body 10 is connected with a signal outputting flexible circuit board 18 for outputting signals obtained by the photographing circuit module 16. A portion of the flexible circuit board 18 which is superposed on the holder 14 is mounted with a gyroscope 187 and an electronic component 188. The flexible circuit board 18 is led out from the movable body 10 and then curved at a plurality of positions and extended to the outside of the support body 20. A spacer 180 is disposed between a lead-out portion from the movable body 10 of the flexible circuit board 18 and the movable body 10. The lead-out portion of the flexible circuit board 18 is extended at a position separated on one side "+Z" of the "Z"-axis direction from the movable body 10.

The movable body 10 is connected with a flexible circuit board 19 for power feeding to the coils 56 and a tip end part of the flexible circuit board 19 is connected with a tip end part 184 of the flexible circuit board 18. The flexible circuit boards 18 and 19 are connected with a flexible circuit board 353 through a connector 185 mounted on the tip end part 184 of the flexible circuit board 18.

The swing drive mechanism 50 is a magnetic drive mechanism which utilizes plate-shaped magnets 52 and the coils 56. The coils 56 are held by the movable body 10 and the magnets 52 are held by inner faces on both sides in the "X"-axis direction of the body part 211 of the module case 21 and by its inner faces on both sides in the "Y"-axis direction. The magnet 52 is magnetized so that its outer face side pole and its inner face side pole are different from each other. Further, the magnet 52 is divided into two pieces in the optical axis "L" direction and is magnetized so that magnetic poles located on the coil 56 side are different from each other in the optical axis "L" direction. Therefore, long side portions of the coil 56 disposed on the upper and lower sides are utilized as an effective side. The module case 21 is structured of magnetic material and functions as a yoke for the magnet 52.

(Structure of Gimbal Mechanism 30 and the Like)

In the optical module 100, in order to correct shakes in a pitching direction and a yawing direction, the movable body 10 is required to be swingably supported around the first axial line "L1" intersecting the optical axis "L" direction and the movable body 10 is required to be swingably supported around the second axial line "L2" intersecting the optical axis "L" direction and the first axial line "L1". Therefore, the gimbal mechanism 30 (support mechanism) is structured between the movable body 10 and the support body 20.

In this embodiment, in order to structure the gimbal mechanism 30, a rectangular movable frame 38 is disposed between a rectangular fixed frame 25 fixed to the cover 22 and a frame 11. The fixed frame 25 is formed with support plate parts 251 protruded to one side "+Z" of the "Z"-axis direction at corner parts diagonally located in a direction where the first axial line "L1" is extended. Further, the fixed frame 25 is formed with protruded parts 252 which are protruded to the other side "−Z" of the "Z"-axis direction in four corner parts.

The movable frame 38 is formed in a rectangular shape having four corner parts 381, 382, 383 and 384 around the optical axis "L". In the four corner parts 381, 382, 383 and 384, two corner parts 381 and 383 diagonally located in the direction where the first axial line "L1" is extended are swingably supported by the support plate parts 251 of the fixed frame 25 through spherical bodies (not shown) or the like, and two corner parts 382 and 384 diagonally located in a direction where the second axial line "L2" is extended swingably support the frame 11 of the movable body 10 through spherical bodies (not shown) or the like. In this embodiment, the movable frame 38 is structured of metal material or the like having elasticity. Four connecting parts 385 connecting four corner parts 381, 382, 383 and 384 with each other are provided with meandering parts 386 which are curved in directions perpendicular to respective extending directions and the "Z"-axis direction. Therefore, the movable frame 38 has elasticity so as not to be resiliently bent to a lower side by the own weight of the movable body 10 but capable of absorbing an impact applied from the outside.

A plate-shaped spring 40 which is connected with the movable body 10 and the fixed frame 25 of the support body 20 is provided between the fixed frame 25 and the cover 22 for restricting a posture of the movable body 10 when the swing drive mechanism 50 is set in a stopped state. The plate-shaped spring 40 is a spring member which is formed by processing a metal plate in a predetermined shape and is provided with a fixed body side connection part 41 in a rectangular frame shape, a movable body side connection part 42 in a circular ring shape, and plate spring parts 43 connecting the fixed body side connection part 41 with movable body side connection part 42. The fixed body side connection part 41 is positioned and fixed by the protruded parts 252 formed at the corner portions of the fixed frame 25 in a superposed state on a face of the fixed frame 25 on the other side "−Z" of the "Z"-axis direction. Further, the fixed frame 25 is fixed to the cover 22 in a state that the protruded parts 252 are fitted to the holes 224 of the cover 22. The movable body side connection part 42 is fixed to the frame 11 by welding or adhesion.

(Pitching Correction and Yawing Correction)

When the optical device 1000 shown in FIG. 1 is swung in a pitching direction and a yawing direction, the swing of the optical module 100 is detected by the gyroscope 187 and the swing drive mechanism 50 is controlled on the basis of the detected result. In other words, a drive current is supplied to the coils 56 so that the swing detected by the gyroscope 187 is canceled and, as a result, the movable body 10 is swung around the first axial line "L1" in an opposite direction to the swing and is swung around the second axial line "L2" in an opposite direction to the swing and thereby the swings in the pitching direction and the yawing direction are corrected.

(Entire Structure of Rolling Correction Drive Mechanism 70)

Figure 7A:
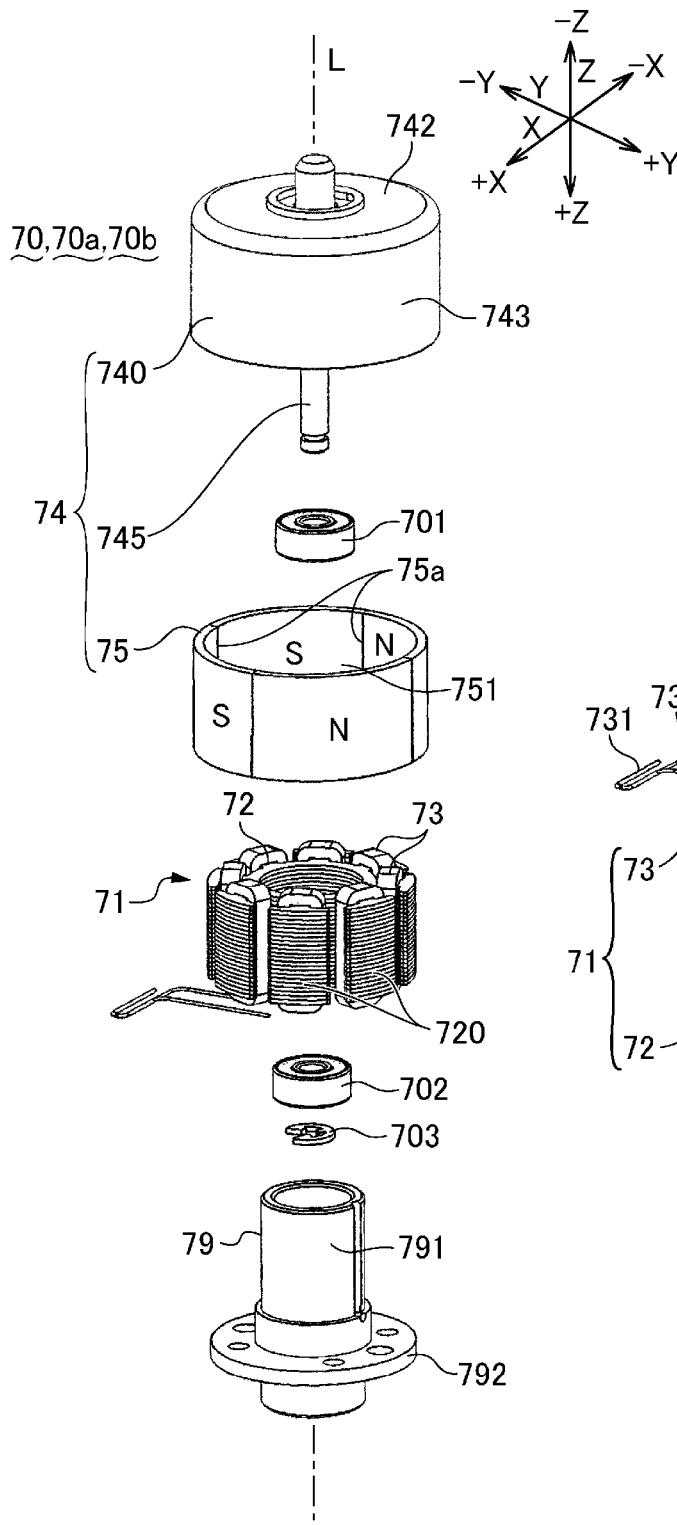
FIGS. 7A and 7B are explanatory views showing a rolling correction drive mechanism of an optical unit in accordance with an embodiment of the present invention.
Figure 7B:
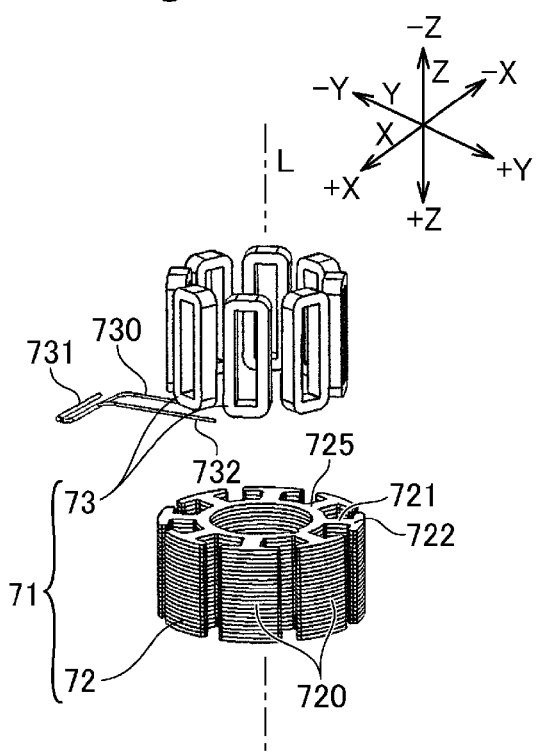
Figure 8A:
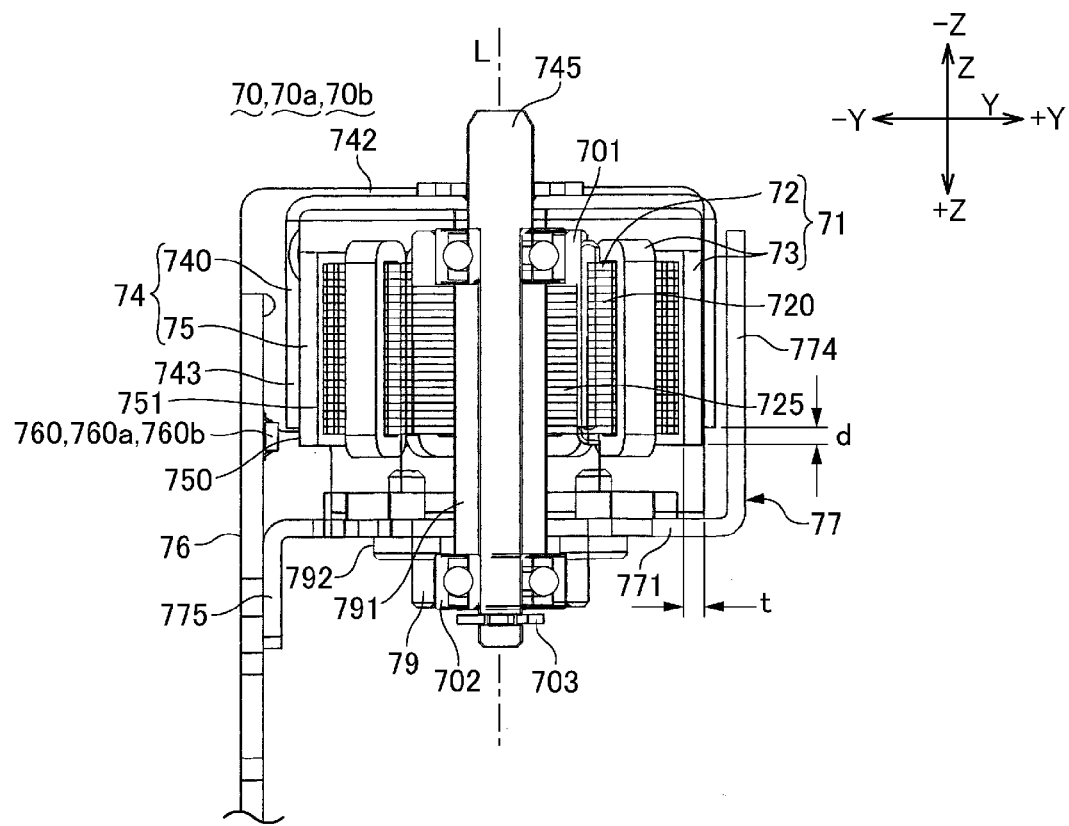
FIGS. 8A and 8B are cross-sectional views showing a rolling correction drive mechanism of an optical unit in accordance with an embodiment of the present invention.
Figure 8B:
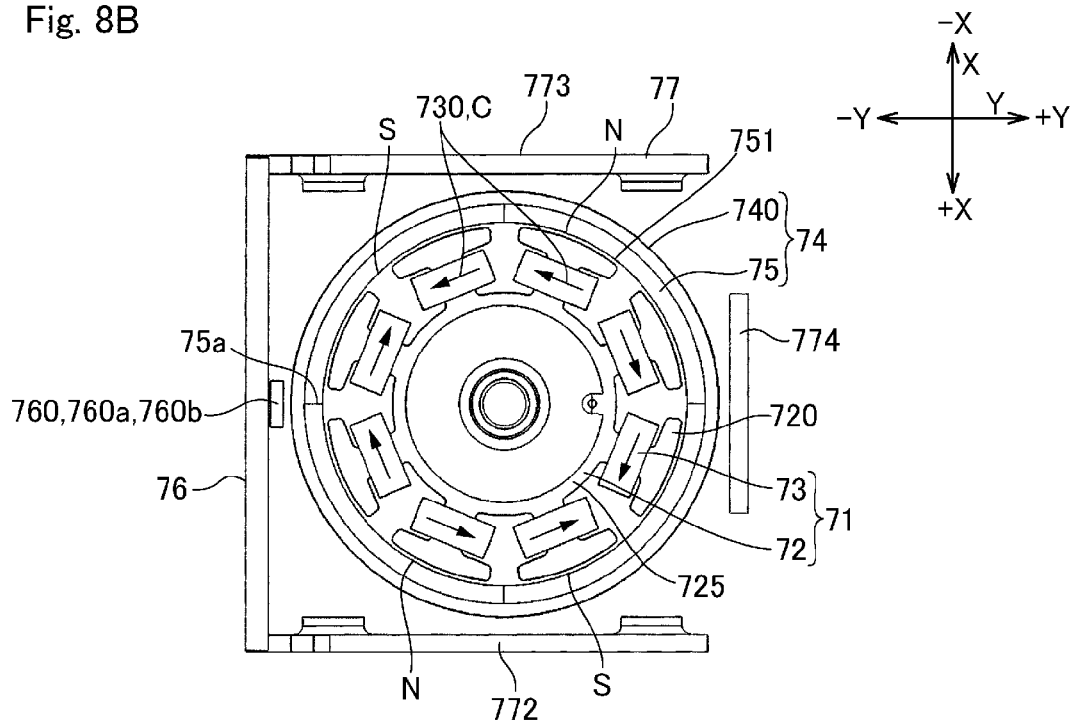

FIGS. 7A and 7B are explanatory views showing the rolling correction drive mechanism 70 of the optical unit 300 in accordance with an embodiment of the present invention. FIG. 7A is an exploded perspective view showing the rolling correction drive mechanism 70 viewed from an object side and FIG. 7B is an exploded perspective view showing a stator 71 of the rolling correction drive mechanism 70. FIGS. 8A and 8B are cross-sectional views showing the rolling correction drive mechanism 70 of the optical unit 300 in accordance with an embodiment of the present invention. FIG. 8A is a "YZ" cross-sectional view showing the rolling correction drive mechanism 70 and FIG. 8B is an "XY" cross-sectional view showing the rolling correction drive mechanism 70.

As shown in FIG. 4, in the optical unit 300 in this embodiment, the optical module 100 is supported by a rotor 74 of the rolling correction drive mechanism 70 disposed on one side "+Z" of the "Z"-axis direction through a connection member 80. The rolling correction drive mechanism 70 turns the optical module 100 in both directions around the optical axis "L" over a predetermined angular range based on a detected result of the gyroscope 781 shown in FIG. 3A and thereby rolling correction is performed.

As shown in FIG. 4, FIGS. 7A and 7B, and FIGS. 8A and 8B, the rolling correction drive mechanism 70 includes a motor 70a which includes a stator 71 held by a support member 77 through a bearing holder 79 disposed on an opposite-to-output side of the motor 70a and the rotor 74 structured to be turned around the optical axis "L". In other words, an axial center of the rotation shaft 745 which is a rotation center of the rotor 74 is coincided with the optical axis "L". In this embodiment, the rolling correction drive mechanism 70 (motor 70a) is a single phase motor 70b. The stator 71 includes a stator core 72 provided with a plurality of salient poles 720 in a circumferential direction and stator coils 73 each of which is wound around each of a plurality of salient poles 720. The salient pole 720 is provided with an arm part 721 protruded to an outer side in a radial direction and a tip end part 722 protruded from an end part on an outer side in the radial direction of the arm part 721 to both sides in a circumferential direction. The stator coil 73 is wound around the arm part 721.

In this embodiment, the motor 70a (single phase motor 70b) is an outer rotor type motor and the stator core 72 is provided with the salient poles 720 which are protruded from a circular ring-shaped part 725 to outer sides in the radial direction. The rotor 74 includes a rotor case 740 in a cup shape and a rotation shaft 745 fixed to an end plate part 742 of the rotor case 740. The rotor 74 includes a rotor magnet 75 which is held by an inner face of a cylindrical shaped body part 743 of the rotor case 740. The rotor magnet 75 faces the salient poles 720 on an outer side in the radial direction so that the rotor 74 is structured as an outer rotor. An inner peripheral face of the rotor magnet 75 facing the salient poles 720 is a magnetized face 751 on which an "S"-pole and an "N"-pole are alternately magnetized in a circumferential direction with equal angular intervals. The magnetized face 751 is a face on a side where a magnetizing head is closely disposed when magnetizing is performed and an outer peripheral face of the rotor magnet 75 is not formed as a magnetized face. The body part 743 of the rotor case 740 functions as a back yoke for the rotor magnet 75.

The rotation shaft 745 is turnably supported by bearings 701 and 702 at positions separated in the "Z"-axis direction. The bearings 701 and 702 are held on an inner side of a cylindrical tube part 791 of the bearing holder 79. The bearing holder 79 is also used as a core holder which holds the stator core 72 and the circular ring-shaped part 725 of the stator core 72 is fitted to an outer side in the radial direction of the cylindrical tube part 791. In this embodiment, a snap ring 703 is attached to an end part on one side "+Z" of the "Z"-axis direction of the rotation shaft 745.

The bearing holder 79 is provided with a flange part 792 in a circular plate shape at a position adjacent to the cylindrical tube part 791 on one side "+Z" of the "Z"-axis direction. The flange part 792 is fixed to a support member 77 by screws 779. The support member 77 is provided with a rectangular bottom plate part 771 to which the flange part 792 of the bearing holder 79 is fixed, a pair of side plate parts 772 and 773 which are bent from end parts on both sides in the "X"-axis direction of the bottom plate part 771 to the other side "−Z" of the "Z"-axis direction (output side), and a side plate part 774 which is bent from an end part on one side "+Y" of the "Y"-axis direction of the bottom plate part 771 to the other side "−Z" of the "Z"-axis direction (output side). The side plate parts 772, 773 and 774 face the body part 743 of the rotor case 740 on an outer side in the radial direction and function as protection plates for the motor 70a.

(Detailed Structure of Rolling Correction Drive Mechanism 70)

Figure 9A:
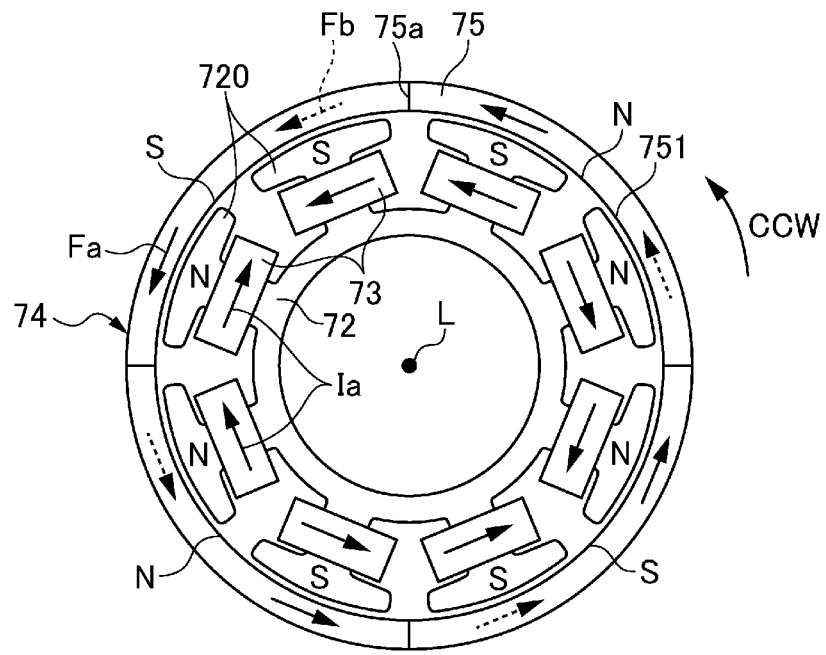
FIGS. 9A and 9B are explanatory views showing an operation of a single phase motor of an optical unit in accordance with an embodiment of the present invention.
Figure 9B:
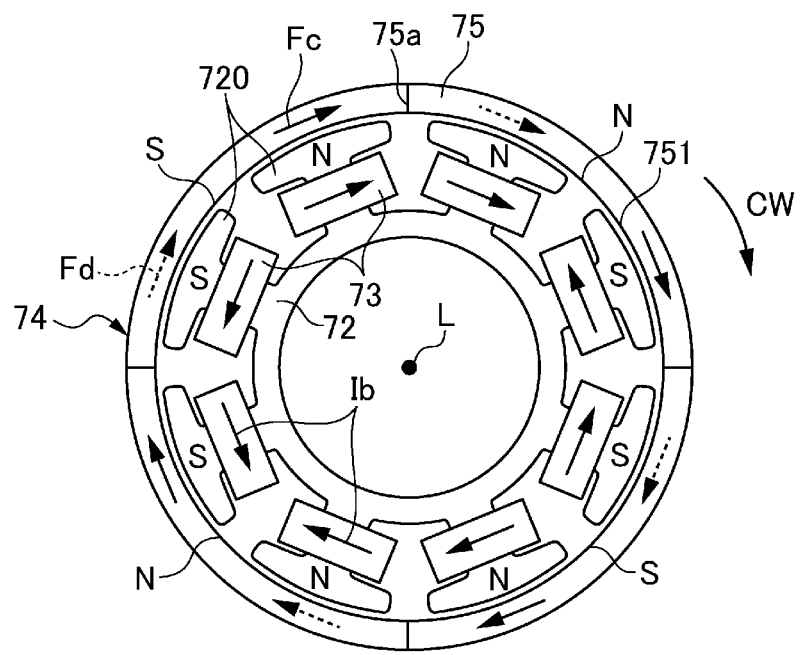
Figure 10A:
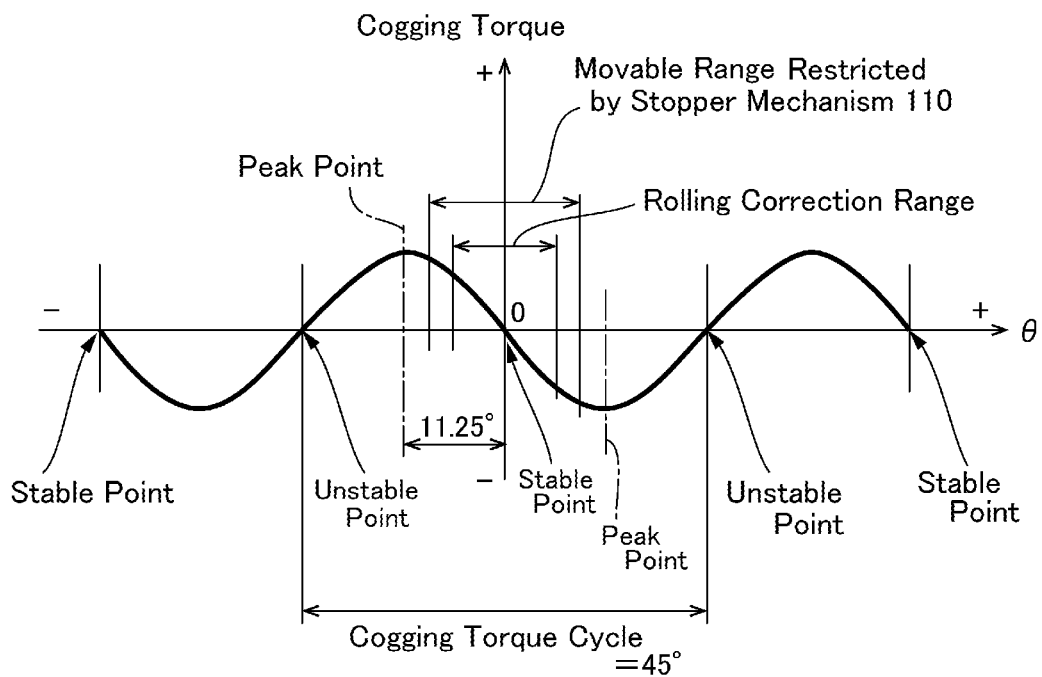
FIGS. 10A and 10B are explanatory views showing a cogging torque of a single phase motor of an optical unit in accordance with an embodiment of the present invention.
Figure 10B:
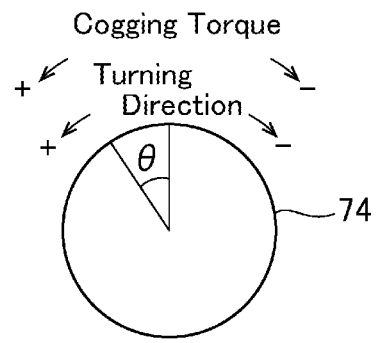

FIGS. 9A and 9B are explanatory views showing an operation of the single phase motor 70b of the optical unit 300 in accordance with an embodiment of the present invention. FIG. 9A is an explanatory view showing a state that the rotor 74 is turned in a counterclockwise direction CCW and FIG. 9B is an explanatory view showing a state that the rotor 74 is turned in a clockwise direction CW. FIGS. 10A and 10B are explanatory views showing a cogging torque of the single phase motor 70b of the optical unit 300 in accordance with an embodiment of the present invention. FIG. 10A is a graph showing a relationship between an angle "θ" of the rotor 74 and a cogging torque and FIG. 10B is an explanatory view showing definitions of directions in the graph shown in FIG. 10A. The cogging torque shown in FIG. 10A is, as shown in FIG. 10B, a torque acting on the rotor 74 when the rotor 74 is held at a turned position of an angle "θ". The "θ" is indicated with "+" when the rotor 74 is turned in a counterclockwise direction and is indicated with "−" when the rotor 74 is turned in a clockwise direction. Therefore, in FIG. 10A, among points where the cogging torque becomes zero (0), a point where the cogging torque acts on the rotor 74 in a clockwise direction (direction of "−") when the rotor 74 is moved in a counterclockwise direction ("+" direction of "θ") and a point where the cogging torque acts on the rotor 74 in a counterclockwise direction (direction of "+") when the rotor 74 is moved in a clockwise direction ("−" direction of "θ") correspond to a "stable point" where a torque preventing the rotor 74 from turning in both directions in a circumferential direction is generated. On the other hand, among the points where the cogging torque becomes zero (0), a point where the cogging torque acts on the rotor 74 in a counterclockwise direction (direction of "+") when the rotor 74 is moved in a counterclockwise direction ("+" direction of "θ") and a point where the cogging torque acts on the rotor 74 in the clockwise direction (direction of "−") when the rotor 74 is moved in the clockwise direction ("−" direction of "θ") correspond to an "unstable point" where a torque for turning the rotor 74 in both directions in a circumferential direction is generated.

In the single phase motor 70b in this embodiment, the number of the salient poles 720 of the stator core 72 around each of which the stator coil 73 is wound is two (2) times of the number of the magnetic poles (sum of the number of "S"-poles and the number of "N"-poles) of the rotor magnet 75. In this embodiment, the number of the magnetic poles of the rotor magnet 75 is four (4) and the number of the salient poles 720 is eight (8). Further, the salient poles 720 is provided at equal angular intervals in a circumferential direction. The stator coil 73 is structured so that, as shown by the arrows "C" in FIG. 8B, one coil wire 730 is wound around a plurality of the salient poles 720 and two end parts 731 and 732 are extended.

The coil wire 730 is wound around a pair of two adjacent salient poles 720 in the same direction as each other and is wound around an adjacent pair of two salient poles 720 in the opposite direction which are located adjacent in the clockwise direction CW to the pair of the two salient poles 720. Further, in a stopped state of the rolling correction drive mechanism 70, in other words, when the rolling correction drive mechanism 70 is not driven, winding directions of the coil wire 730 wound around two adjacent salient poles 720 facing one pole of the rotor magnet 75 are set to be opposite to each other. Therefore, when an electric current is supplied to the coil wire 730, two adjacent salient poles 720 facing one pole of the rotor magnet 75 are magnetized in reverse poles.

As shown in FIG. 9A, when the rotor 74 is to be turned in a counterclockwise direction CCW, an electric current as shown by the arrows "Ia" is supplied to the stator coils 73. As a result, one pole of the rotor magnet 75 is acted with an attraction force in the counterclockwise direction CCW shown by the arrow "Fa" of a solid line between one of two salient poles 720 and the one pole and, on the other hand, a repulsive force in the counterclockwise direction CCW as shown by the arrow "Fb" of a dotted line is acted between the other of the two salient poles 720 and the one pole. Therefore, the rotor 74 is turned in the counterclockwise direction CCW and thus the optical module 100 is turned in the counterclockwise direction CCW.

As shown in FIG. 9B, when the rotor 74 is to be turned in a clockwise direction CW, an electric current as shown by the arrows "Ib" is supplied to the stator coils 73. As a result, one pole of the rotor magnet 75 is acted with an attraction force in the clockwise direction CW shown by the arrow "Fc" of a solid line between one of two salient poles 720 and the one pole and, on the other hand, a repulsive force in the clockwise direction CW as shown by the arrow "Fd" of a dotted line is acted between the other of the two salient poles 720 and the one pole. Therefore, the rotor 74 is turned in the clockwise direction CW and thus the optical module 100 is turned in the clockwise direction CW. In the single phase motor 70b structured as described above, in order to perform rolling correction of the optical module 100, the rotor 74 is turned within an angular range interposed by two adjacent peak points of the cogging torque with the stable point as a center and thereby the optical module 100 is turned in a reciprocated manner. In this embodiment, the number of the magnetic poles of the rotor magnet 75 is four (4) and the number of the salient poles 720 is eight (8) and thus a cogging torque cycle of the single phase motor 70b is 45° as shown by the cogging torque characteristic in FIG. 10A. Therefore, the position where the cogging torque becomes the maximum value appears at a cycle of 22.5°. However, in order to perform rolling correction of the optical module 100, it is practically sufficient that the optical module 100 is turned in a range of about 12° (+6°. Therefore, according to the single phase motor 70b in this embodiment, when rolling correction of the optical module 100 is to be performed, the rotor 74 is turned in an angular range interposed by two adjacent peak points of the cogging torque with a stable point as a center and the optical module 100 can be turned in an reciprocated manner.

(Structure of Connection Member 80)

Figure 11:
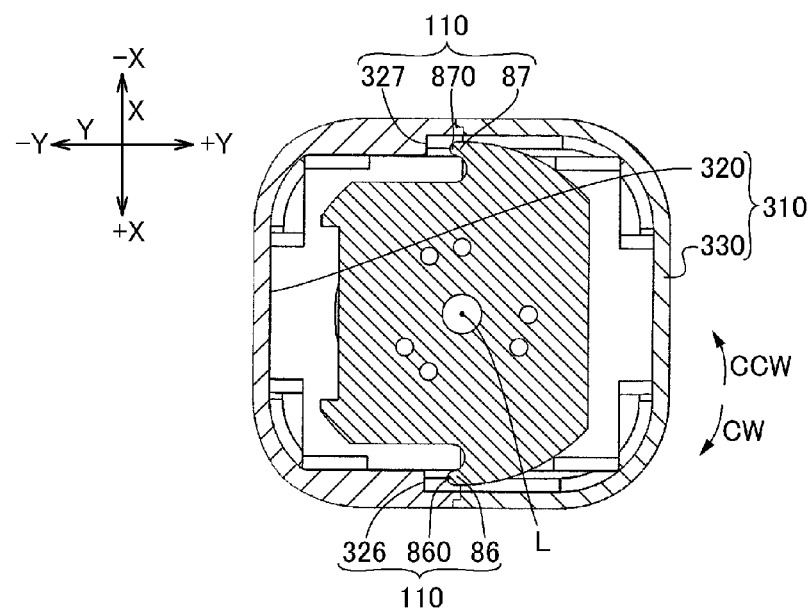
FIG. 11 is an explanatory view showing a stopper mechanism of an optical unit in accordance with an embodiment of the present invention.

FIG. 11 is an explanatory view showing a stopper mechanism 110 of the optical unit 300 in accordance with an embodiment of the present invention. FIG. 11 is an "XY" cross-sectional view showing a state that the optical unit 300 is cut at a position passing the connection member 80.

In this embodiment, the optical module 100 is connected with an end part on the other side "−Z" of the "Z"-axis direction of the rotation shaft 745 of the motor 70a through the connection member 80. In this embodiment, the connection member 80 is provided with a rectangular plate part 81 supporting the optical module 100, plate-shaped positioning protruded parts 82 and 83 which are bent from end parts on both sides in the "X"-axis direction of the plate part 81 to the other side "−Z" of the "Z"-axis direction, and a pair of positioning protruded parts 84 which are bent at an end part on the other side "−Y" of the "Y"-axis direction of the plate part 81 to the other side "−Z" of the "Z"-axis direction. The optical module 100 is fixed to the plate part 81 in a state positioned by the positioning protruded parts 82, 83 and 84. Therefore, the optical module 100 is integrally turned with the rotation shaft 745 (rotor 74) of the motor 70a. The connection member 80 is provided with a cylindrical tube part (not shown) protruded from the plate part 81 to one side in the "Z"-axis direction and is fixed to the rotation shaft 745 with screws in a state that the rotation shaft 745 is fitted to the cylindrical tube part.

The connection member 80 is provided with a stopper protruded part 86 which is protruded from an end part on one side "+X" of the "X"-axis direction of the plate part 81 further to one side "+X" of the "X"-axis direction and a stopper protruded part 87 which is protruded from an end part on the other side "−X" of the "X"-axis direction of the plate part 81 further to the other side "−X" of the "X"-axis direction.

As shown in FIG. 11, tip end parts 860 and 870 of the stopper protruded parts 86 and 87 are directed to the other side "−Y" of the "Y"-axis direction. Further, an inner face of the first case member 320 of the unit case 310 is formed with a receiving part 326, which faces the tip end part 860 of the stopper protruded part 86 on the other side "−Y" of the "Y"-axis direction, and a receiving part 327 which faces the tip end part 870 of the stopper protruded part 87 on the other side "−Y" of the "Y"-axis direction. Therefore, when the connection member 80, the optical module 100 and the rotation shaft 745 are turned in the clockwise direction CW around the optical axis "L", the tip end part 860 of the stopper protruded part 86 is abutted with the receiving part 326 and a movable range in the clockwise direction CW of the optical module 100 is restricted. Further, when the connection member 80, the optical module 100 and the rotation shaft 745 are turned in the counterclockwise direction CCW around the optical axis "L", the tip end part 870 of the stopper protruded part 87 is abutted with the receiving part 327 and a movable range in the counterclockwise direction CCW of the optical module 100 is restricted.

As described above, in this embodiment, the stopper mechanism 110 for restricting a movable range around the optical axis "L" of the optical module 100 is structured of the stopper protruded parts 86 and 87 of the connection member 80 and the receiving parts 326 and 327 of the unit case 310. A movable range of the optical module 100 which is restricted by the stopper mechanism 110 is, as shown in FIG. 10A, set to be wider than the rolling correction range and narrower than the angular range interposed by two adjacent peak points of the cogging torque. Therefore, the optical module 100 can be prevented from turning excessively by a torque applied from the outside. Further, in the stopper mechanism 110, the stopper protruded parts 86 and 87 formed in the connection member 80 are abutted with the receiving parts 326 and 327 of the unit case 310 to restrict a movable range of the optical module 100. Therefore, the stopper mechanism 110 can be structured without using another member.

(Structure of Circuit Board 76)

In FIG. 3, FIG. 4 and FIGS. 8A and 8B, the support member 77 is provided with no side plate part on the other side "−Y" of the "Y"-axis direction and is provided at an end part on the other side "−Y" of the "Y"-axis direction of the bottom plate part 771 with a pair of connecting plate parts 775 which are bent from end parts on both sides in the "X"-axis direction to one side "+Z" of the "Z"-axis direction. Therefore, the support member 77 is formed in an opened state on the other side "−Y" of the "Y"-axis direction of the body part 743 of the rotor case 740. A circuit board 76 is fixed to the connecting plate parts 775 on the other side "−Y" of the "Y"-axis direction of the support member 77 and the circuit board 76 is set in a contacted state with an end part of the bottom plate part 771 of the support member 77 and end parts of the side plate parts 772 and 773. In this state, on the other side "−Y" of the "Y"-axis direction, the circuit board 76 faces the body part 743 of the rotor case 740 on an outer side in a radial direction to structure a protection plate for the motor 70a. Therefore, the single phase motor 70b can be protected by the circuit board 76. Further, the support member 77 is provided with no side plate part on the other side "−Y" of the "Y"-axis direction and thus, the end parts 731 and 732 of the stator coil 73 can be easily connected with the circuit board 76 on the other side "−Y" of the "Y"-axis direction.

(Structure of Angular Position Detection Sensor 760 and the Like)

Figure 12A:
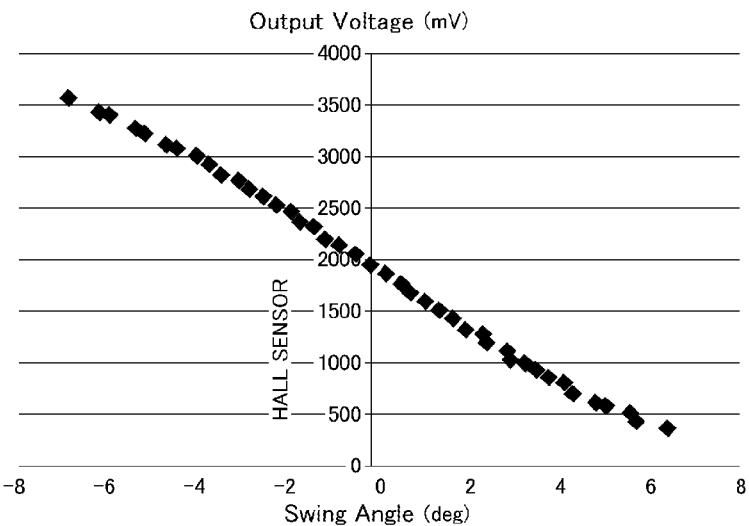
FIGS. 12A, 12B and 12C are explanatory views showing an angular position detection sensor which is structured in an optical unit in accordance with an embodiment of the present invention.
Figure 12B:
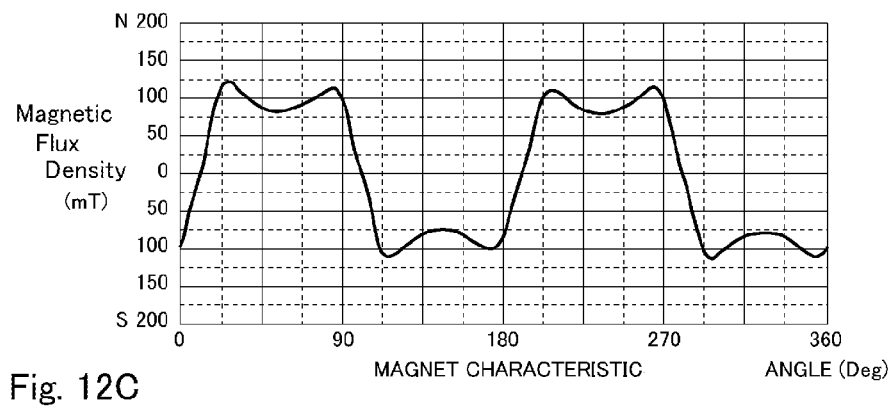
Figure 12C:
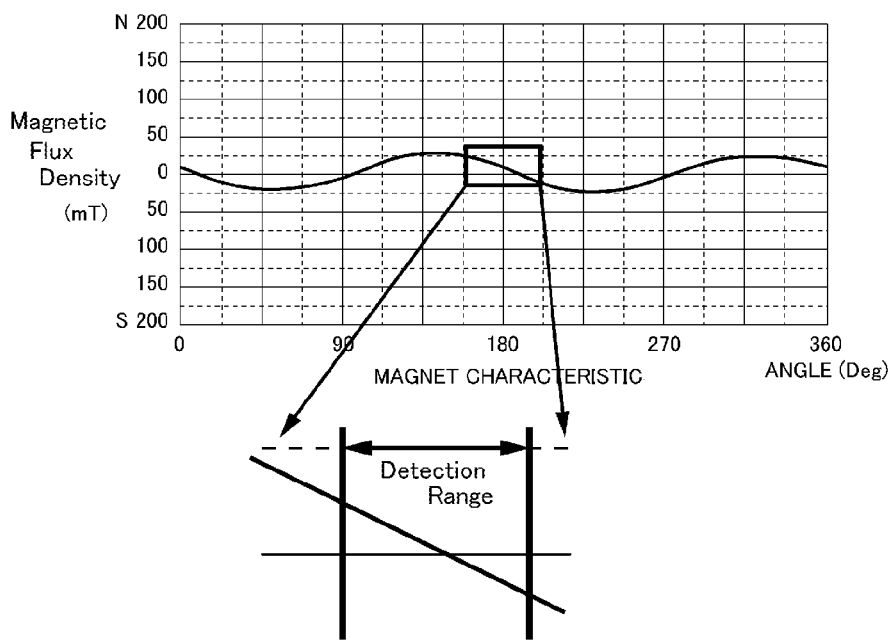

FIGS. 12A, 12B and 12C are explanatory views showing an angular position detection sensor 760 which is structured in the optical unit 300 in accordance with an embodiment of the present invention. FIG. 12A is an explanatory view showing an output characteristic of the angular position detection sensor 760, FIG. 12B is an explanatory view showing magnetic flux density on an inner peripheral side of the rotor magnet 75, and FIG. 12C is an explanatory view showing magnetic flux density on an outer peripheral side of the rotor magnet 75.

A circuit board face 76a of the circuit board 76 facing the body part 743 side of the rotor case 740 is mounted with the angular position detection sensor 760 for detecting an angular position of the rotor 74 (optical module 100). The angular position detection sensor 760 is a magnetic detection element 760a and it faces the rotor magnet 75 on an opposite side to the stator core 72. In this embodiment, the magnetic detection element 760a is a Hall element 760b and, when the rolling correction drive mechanism 70 is not driven, in other words, when a swing in a rolling direction is not detected, the magnetic detection element 760a faces a magnetic pole boundary line 75a between an "N"-pole and an "S"-pole of the rotor magnet 75.

As shown in FIG. 8A, the rotor 74 is provided with the body part 743 (back yoke) of the rotor case 740 on an outer side in a radial direction of the rotor magnet 75 and, when viewed from an outer side in the radial direction, the rotor magnet 75 is exposed from an end part on one side "+Z" of the "Z"-axis direction of the body part 743. The magnetic detection element 760a (Hall element 760b) faces the exposed portion 750 on an outer side in the radial direction. The magnetic detection element 760a (Hall element 7601)) is disposed on an outer side in the radial direction with respect to an outer side face in the radial direction of the body part 743 and is disposed so as to be separated from the rotor magnet 75 with a distance not less than the thickness of the body part 743 therebetween. A dimension "d" in the "Z"-axis direction of the exposed portion 750 of the rotor magnet 75 is not more than a thickness "t" of the rotor magnet 75.

As described above, in this embodiment, the magnetic detection element 760a faces the rotor magnet 75 on an opposite side to the magnetized face 751 of the rotor magnet 75 in a separated state with a sufficient gap space therebetween. Therefore, as shown in FIG. 12A, when the rolling correction drive mechanism 70 is not driven, the magnetic detection element 760a faces the magnetic pole boundary line 75a between an "N"-pole and an "S"-pole of the rotor magnet 75 and thus the output is 0V. However, when the rotation shaft 745 is turned and the rotor magnet 75 is moved in a circumferential direction, an output from the magnetic detection element 760a is varied in a substantially linear manner with respect to the angular position of the rotor magnet 75.

In other words, as shown in FIG. 12B, an inner peripheral face of the rotor magnet 75 is the magnetized face 751 and thus, magnetic flux density varies in a complicated manner in a circumferential direction and steeply varies at a switching position of the magnetic poles on its inner side in the radial direction. On the other hand, as shown in FIG. 12C, on an outer side in the radial direction of the rotor magnet 75 (opposite side to the magnetized face 751), magnetic flux density at a position separated by 1 mm from the rotor magnet 75 varies in a substantially sinusoidal manner in a circumferential direction and thus a region exists where the magnetic flux density varies in a substantially linear manner in a circumferential direction. Therefore, in a case that the magnetic detection element 760a faces the rotor magnet 75 on an opposite side to the magnetized face 751 of the rotor magnet 75 in a separated state with a sufficient gap space therebetween like this embodiment, an output as shown in FIG. 12A can be obtained.

In this embodiment, the magnetic detection element 760a is a Hall element 760b and thus polarity of the output is reversed as the rotor magnet 75 is moved. Therefore, an angular position of the rotor magnet 75 can be detected.

(Rolling Correction)

In the optical module 100, when the optical device 1000 shown in FIG. 1 is swung in a rolling direction, the swing is detected by the gyroscope 781 and, based on the detected result, the rolling correction drive mechanism 70 is controlled. In other words, a drive current is supplied to the stator coil 73 so as to cancel the swing which is detected by the gyroscope 781 and, as a result, the rotor 74 is driven around the optical axis "L" in an opposite direction to the swing. Therefore, the optical module 100 is turned around the optical axis "L" in an opposite direction to the swing. In this case, the angular position detecting sensor 760 (magnetic detection element 760a, Hall element 760b) detects an angular position of the rotor 74 and, based on the detected result, the rolling correction drive mechanism 70 is controlled. Therefore, the rotor 74 and the optical module 100 is returned to a reference position and the swing in the rolling direction is corrected.

(Principal Effects in this Embodiment)

As described above, in the optical unit 300 in this embodiment, the movable body 10 holding an optical element such as a lens 1a and the swing drive mechanism 50 are provided in the optical module 100 to perform pitching correction and yawing correction in the optical module 100, and the rolling correction is performed by turning the optical module 100 around the optical axis "L" by the rolling correction drive mechanism 70. Therefore, the rolling correction is independently performed from the pitching correction and the yawing correction and thus control of the swing correction is easily performed. Further, in a case that the rolling correction is not required, the optical module 100 can be used independently.

A single phase motor 70b (motor 70a) is used in the rolling correction drive mechanism 70 and the single phase motor utilizes an attraction force and a repulsive force by the rotor magnet 75 and thus a large torque can be obtained in comparison with a case that a Lorentz force is utilized.

Especially, in this embodiment, the number of the salient poles 720 of the stator core 72 is two times of the number of magnetic poles of the rotor magnet 75. Therefore, since the number of the salient poles 720 is increased, the winding number of the stator coil 73 around the salient pole 720 can be reduced. Accordingly, the volume occupied by the stator coil 73 is reduced and thus the size of the single phase motor 70b in the optical axis "L" direction can be reduced. As a result, the size of the optical unit 300 in the optical axis "L" direction can be reduced.

The single phase motor 70b reciprocatedly turns the optical module 100 in an angular range interposed by two adjacent peak points of the cogging torque with the stable point as a center. Therefore, the single phase motor 70b is not required to apply a torque exceeding a ripple of the cogging torque to the optical module 100. Accordingly, power saving of the single phase motor 70b can be attained. Further, the cogging torque applied to the optical module 100 can be utilized as a magnetic spring for returning the optical module 100 to a reference position around the optical axis "L" and thus a mechanical spring is not required to provide separately.

In this embodiment, an angular position detection sensor 760 for detecting an angular position around the optical axis "L" of the optical module 100 is structured of the magnetic detection element 760a which faces the rotor magnet 75 of the single phase motor 70b (motor 70a) used in the rolling correction drive mechanism 70. Therefore, an angular position around the optical axis "L" of the optical module 100 can be detected with a simple structure. Even in this case, the magnetic detection element 760a faces the rotor magnet 75 on an opposite side to the stator core 72 and thus the magnetic detection element 760a is capable of detecting an angular position around the optical axis "L" of the optical module 100 without being affected by the stator core 72. Further, the magnetic detection element 760a faces the rotor magnet 75 on an opposite side to the magnetized face (face on the stator core 72 side) and thus distribution of the magnetic flux density of the rotor magnet 75 in a circumferential direction varies continuously and gradually on the opposite side to the magnetized face. Therefore, a high degree of linearity of an output from the magnetic detection element 760a is attained.

In this embodiment, the single phase motor 70b is an outer rotor type motor and thus the dimension in a circumferential direction of the rotor magnet 75 is long. Therefore, a high degree of resolution of a detected result of the magnetic detection element 760a can be attained.

The single phase motor 70b is provided with the body part 743 (back yoke) of the rotor case 740 to an outer side in a radial direction of the rotor magnet 75 and the magnetic detection element 760a faces the exposed portion 750 of the rotor magnet 75 from the body part 743 when viewed from an outer side in the radial direction. Therefore, even when a back yoke (body part 743) is disposed on an outer side in a radial direction of the rotor magnet 75, the back yoke is hard to affect a detected result of the magnetic detection element 760a. Even in this case, a dimension of the exposed portion 750 is set not more than the thickness of the rotor magnet 75 and thus lowering of strength of the exposed portion 750 of the rotor magnet 75 can be restrained.

The magnetic detection element 760a is disposed on an outer side in a radial direction with respect to an outer side face in a radial direction of the body part 743 (back yoke) and thus the magnetic detection element 760a and the rotor magnet 75 are separated from each other sufficiently. Therefore, distribution of the magnetic flux density in a circumferential direction varies continuously and gradually and thus a high degree of linearity of an output from the magnetic detection element 760a is obtained.

The magnetic detection element 760a is mounted on the circuit board 76 for supplying electric power to the stator coils 73 and thus the magnetic detection element 760a is disposed with a simple structure.

The magnetic detection element 760a is a Hall element 760b and thus, based on an output from the Hall element 760b, a moving direction in a circumferential direction of the rotor magnet 75 can be detected.

OTHER EMBODIMENTS

Figure 13A:
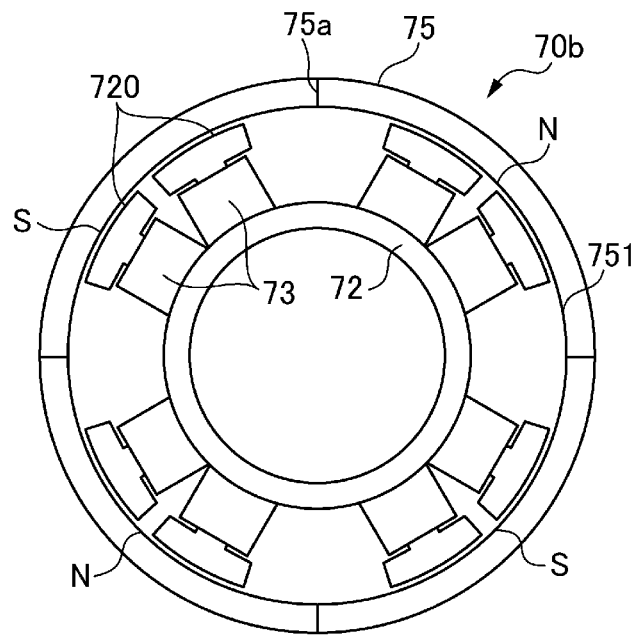
FIGS. 13A and 13B are explanatory views showing modified embodiments of a rolling correction drive mechanism of an optical unit in accordance with an embodiment of the present invention.
Figure 13B:
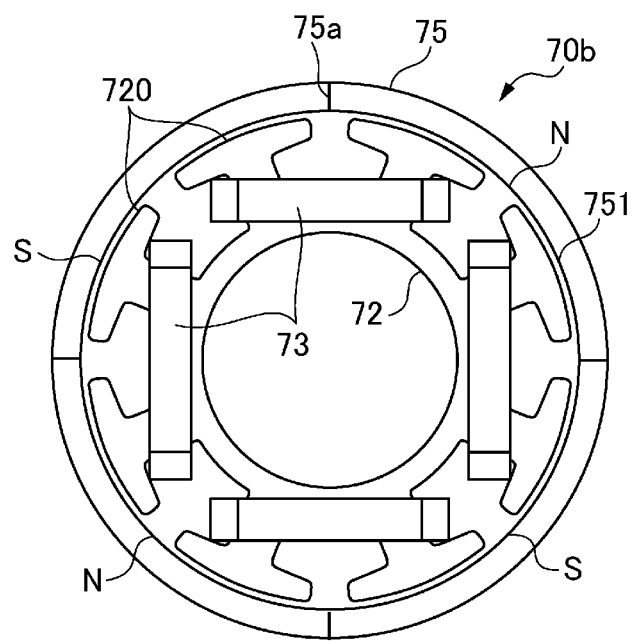

FIGS. 13A and 13B are explanatory views showing modified embodiments of the rolling correction drive mechanism 70 of the optical unit 300 in accordance with an embodiment of the present invention. FIG. 13A is an explanatory view showing a first modified embodiment and FIG. 13B is an explanatory view showing a second modified embodiment.

In the embodiment shown in FIG. 8B and FIGS. 9A and 9B, all of a plurality of the salient poles 720 are formed in a circumferential direction at equal angular intervals. However, it may be structured that, as shown in FIG. 13A, a distance between two salient poles 720 facing the same magnetic pole of the rotor magnet 75 is different from a distance between two salient poles 720 facing different magnetic poles of the rotor magnet 75.

In the embodiment shown in FIG. 8B and FIGS. 9A and 9B, the stator coil 73 is wound around a plurality of the salient poles 720 in a one-to-one relationship. However, as shown in FIG. 13B, it may be structured that a common stator coil 73 is wound around so as to extend over two adjacent salient poles 720 in a circumferential direction around which the stator coil 73 is to be wound around in the same direction.

In the embodiment described above, an outer rotor type motor 70a in which a rotor magnet faces the salient poles 720 from an outer side in a radial direction is used in the rolling correction drive mechanism 70. However, an inner rotor type motor in which a rotor magnet faces the salient pole 720 from an inner side in a radial direction may be used in the rolling correction drive mechanism 70, or a face-to-face type motor in which a rotor magnet faces a stator in the "Z"-axis direction may be used in the rolling correction drive mechanism 70.

In the embodiment described above, the gyroscope 781 sensing a swing in a rolling direction and the gyroscope 187 sensing swings in a pitch direction and a yawing direction are disposed separately. However, a sensor may be used which is structured of a gyroscope 187 capable of sensing a swing in the rolling direction in addition to swings in a pitch direction and a yawing direction.

[Using Examples of Optical Unit 300]

The optical unit 300 to which at least an embodiment of the present invention is applied may be used for shake correction of an optical device from which a light beam is emitted such as a portable or on-vehicle projection display device and a direct viewing type display device. Further, the optical unit 300 may be used to observe an object in an observation system with a high magnification such as an astronomical telescope system or a binocular system without using an auxiliary locking device such as a tripod. Further, when an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
    an optical module comprising:
        a movable body which holds an optical element;
        a support body which swingably supports the movable body around two axial lines perpendicular to an optical axis of the optical element; and
        a swing drive mechanism structured to reciprocatedly swing the movable body with respect to the support body around the two axial lines; and
    a rolling correction drive mechanism structured to reciprocatedly turn the optical module around the optical axis;
    wherein the rolling correction drive mechanism comprises a single phase motor in which a number of salient poles of a stator core around which a stator coil is wound is two times of a number of magnetic poles of a rotor magnet.

2. The optical unit with a shake correction function according to claim 1, wherein the single phase motor is structured to reciprocatedly turn the optical module within an angular range interposed by two adjacent peak points of a cogging torque with a stable point as a center.

3. The optical unit with a shake correction function according to claim 2, wherein the number of the magnetic poles is four and the number of the salient poles is eight.

4. The optical unit with a shake correction function according to claim 2, further comprising a stopper mechanism structured to restrict a movable range of the optical module around the optical axis.

5. The optical unit with a shake correction function according to claim 4, wherein
    a rotor of the single phase motor and the optical module are connected with each other through a connection member,
    the stopper mechanism comprises a stopper protruded part which is formed in the connection member, and
    the movable range of the optical module is restricted by abutting the stopper protruded part with a unit case surrounding the optical module and the single phase motor.

6. The optical unit with a shake correction function according to claim 5, wherein the movable range which is restricted by the stopper mechanism is set to be narrower than the angular range interposed by the two adjacent peak points of the cogging torque.

7. The optical unit with a shake correction function according to claim 6, wherein the number of the magnetic poles is four and the number of the salient poles is eight.

8. The optical unit with a shake correction function according to claim 4, wherein the movable range which is restricted by the stopper mechanism is set to be narrower than the angular range interposed by the two peak points of the cogging torque.

9. The optical unit with a shake correction function according to claim 1, wherein
the single phase motor comprises:
a bearing which turnably supports the rotor magnet;
a bearing holder which holds the bearing; and
a support member which holds the bearing holder; and
the support member comprises:
a bottom plate part which holds the bearing holder on an opposite-to-output side of the single phase motor; and
a side plate part which is bent from the bottom plate part to an output side and structured to protect the single phase motor on an outer side in a radial direction.

10. The optical unit with a shake correction function according to claim 1, wherein
the single phase motor comprises:
a stator comprising the stator core and the stator coil; and
a rotor comprising a rotation shaft which is capable of turning together with the rotor magnet,
the stator core is provided with a circular ring-shaped part and a plurality of the salient poles which are protruded in a radial direction from the circular ring-shaped part and around which the stator coil is wound,
the rotation shaft of the rotor is connected with the optical module through a connection member, and
an axial center of the rotation shaft is coincided with the optical axis.

11. The optical unit with a shake correction function according to claim 10, wherein
the single phase motor comprises:
a bearing which turnably supports the rotor magnet;
a bearing holder which holds the bearing; and
a support member which holds the bearing holder; and
the support member is fixed to a unit case surrounding the optical module and the single phase motor,
the stator is held by the support member through the bearing holder, and
the optical module is supported by the support member and structured to reciprocately turn around the optical axis through a rotation shaft of the single phase motor.

12. The optical unit with a shake correction function according to claim 11, wherein
the rotor is an outer rotor having the rotor magnet which is held on an inner face of a cylindrical shaped body part of a rotor case,
the rotor magnet faces the salient poles on an outer side in the radial direction,
an inner peripheral face of the rotor magnet which faces the salient poles is a magnetized face which is alternately magnetized with an "S"-pole and an "N"-pole in a circumferential direction with equal angular intervals,
an angular position detection sensor structured to detect an angular position of the rotor faces the rotor magnet on an opposite side to the salient poles, and
when the rolling correction drive mechanism is not driven, the angular position detection sensor faces a magnetic pole boundary line between the "N"-pole and the "S"-pole of the rotor magnet.

13. The optical unit with a shake correction function according to claim 12, wherein the number of the magnetic poles is four and the number of the salient poles is eight.

14. The optical unit with a shake correction function according to claim 13, wherein the rotor magnet is turned in an angular range of 12° with respect to the stator core to perform rolling correction.

15. The optical unit with a shake correction function according to claim 11, wherein
the connection member is provided with a rectangular plate part which supports the optical module and a positioning protruded part provided in the plate part,
the optical module is fixed to the plate part in a state that the optical module is positioned by the positioning protruded part, and
a stopper mechanism structured to restrict a movable range of the optical module around the optical axis is provided between the connection member and the unit case.

16. The optical unit with a shake correction function according to claim 10, wherein the single phase motor is structured to reciprocately turn the optical module within an angular range interposed by two adjacent peak points of a cogging torque with a stable point as a center.

17. The optical unit with a shake correction function according to claim 16, wherein the number of the magnetic poles is four and the number of the salient poles is eight.

18. The optical unit with a shake correction function according to claim 10, wherein
a coil wire which structures the stator coil is wound around a pair of two adjacent salient poles in a same direction,
the coil wire is wound around another pair of two adjacent salient poles in an opposite direction, and
winding directions of the coil wire around two salient poles facing one pole of the rotor magnet are opposite to each other.

19. The optical unit with a shake correction function according to claim 18, wherein the single phase motor is structured to reciprocately turn the optical module within an angular range interposed by two adjacent peak points of a cogging torque with a stable point as a center.

20. The optical unit with a shake correction function according to claim 19, wherein the number of the magnetic poles is four and the number of the salient poles is eight.

21. The optical unit with a shake correction function according to claim 19, wherein the rotor magnet is turned in an angular range of 12° with respect to the stator core to perform rolling correction.

* * * * *